(12) United States Patent
Ibitoye (10) Patent No.: US 11,007,953 B2
(45) Date of Patent: May 18, 2021

(54) APPARATUS AND SYSTEM FOR AN AUTOMATED BUMPER PROTECTION ROLL

(71) Applicant: Ayodeji Stephen Ibitoye, Staten Island, NY (US)

(72) Inventor: Ayodeji Stephen Ibitoye, Staten Island, NY (US)

( * ) Notice: Subject to any disclaimer, the term of this patent is extended or adjusted under 35 U.S.C. 154(b) by 2 days.

(21) Appl. No.: 15/360,426

(22) Filed: Nov. 23, 2016

(65) Prior Publication Data

US 2020/0130609 A1    Apr. 30, 2020

(51) Int. Cl.
*B60R 19/44* (2006.01)
*B60R 13/04* (2006.01)
(Continued)

(52) U.S. Cl.
CPC ............ *B60R 13/04* (2013.01); *B60R 19/023* (2013.01); *B60R 19/44* (2013.01); *B60R 19/483* (2013.01);
(Continued)

(58) Field of Classification Search
CPC ....... B60R 19/02; B60R 19/023; B60R 19/04; B60R 19/14; B60R 19/24; B60R 19/38;
(Continued)

(56) References Cited

U.S. PATENT DOCUMENTS 4,657,298 A * 4/1987 O .............................. B60J 11/02
135/119
4,737,536 A * 4/1988 Kawase ................ C08L 53/025
524/451

(Continued)

FOREIGN PATENT DOCUMENTS

WO    WO-0048866 A1 *  8/2000  ............. B60R 19/04

*Primary Examiner* — Hilary L Gutman
(74) *Attorney, Agent, or Firm* — Patent Ventures, LLC (57) ABSTRACT

The present invention provides for an apparatus for an automated bumper protection roll, comprising: at least one housing member with a roller rotationally disposed within, wherein each terminal end of the roller is affixed to any one of an electro-mechanical rotational means and adapted for causing axial rotation of the roller; any one of roll-able polymer protective bumper sheet, wherein a partial or entire length of said sheet, in a retracted state, is rolled around the roller, such that the sheet is disposed entirely or substantially within the housing member; the partial or entire length of said sheet extends from the housing member by rotating the roller in a counter directional manner from the retracted state; and the entire width of said sheet extends from one terminal end of the roller to a second terminal end of the roller; a power circuitry disposed within the housing member and in operable communication with the electro-mechanical rotational means coupled to any one of, or combination of, the first, and, or the second terminal end of the roller adapted for causing axial rotation of the roller and any one of, or combination of, protraction, and, or retraction of the roll-able polymer protective bumper sheet; a control circuit with programmable logic disposed within the housing member further comprising a Radio Frequency (RF) interface module in communication with the remote RF control, wherein an RF signal emitted from the remote RF control activates the power circuitry operably coupled to the electro-mechanical rotational means and any one of, or combination, of the first and, or second terminal end of the roller adapted for causing axial rotation of the roller and any one of, or combination of, protraction and, or retraction of roll-able polymer protective bumper sheet.

8 Claims, 4 Drawing Sheets

(51) Int. Cl.
    *B60R 19/48*     (2006.01)
    *H02S 10/40*     (2014.01)
    *B60R 19/02*     (2006.01)
    *H04W 4/80*     (2018.01)
    *H04L 29/08*     (2006.01)

(52) U.S. Cl.
    CPC .............. *H02S 10/40* (2014.12); *H04L 67/12* (2013.01); *H04W 4/80* (2018.02)

(58) Field of Classification Search
    CPC ......... B60R 19/42; B60R 19/44; B60R 19/48; B60R 19/483; B60R 13/04; B60J 11/00; B60J 11/02; B60J 11/025; B60J 11/06
    USPC ....... 293/102, 116, 118, 126, 127, 128, 142; 296/136.01, 136.02, 136.1, 136.13
    See application file for complete search history.

(56) References Cited

U.S. PATENT DOCUMENTS

| | | | | |
|---|---|---|---|---|
| 4,848,823 | A * | 7/1989 | Flohr | B60J 11/02 296/98 |
| 5,176,421 | A * | 1/1993 | Fasiska | B60J 11/02 150/166 |
| 5,902,003 | A * | 5/1999 | Hindson | B60J 11/02 293/128 |
| 9,908,394 | B2 * | 3/2018 | Romero Regalado | B60R 19/48 |
| 9,937,884 | B2 * | 4/2018 | Dagrossa | B60J 11/06 |
| 10,232,812 | B2 * | 3/2019 | Prevor | B60R 19/50 |
| 10,239,478 | B2 * | 3/2019 | Churchwell, II | B60R 19/023 |
| 2007/0029827 | A1 * | 2/2007 | Meyer | B60R 19/44 293/142 |
| 2007/0290515 | A1 * | 12/2007 | Doan | B60R 19/38 293/119 |
| 2008/0129060 | A1 * | 6/2008 | Schutt | B60R 19/02 293/136 |
| 2008/0258482 | A1 * | 10/2008 | Udolph | B60R 19/42 293/128 |
| 2009/0058111 | A1 * | 3/2009 | Perarnau Ramos | B60R 19/04 293/120 |
| 2011/0088855 | A1 * | 4/2011 | Boustani | B60J 11/02 160/370.22 |
| 2011/0193315 | A1 * | 8/2011 | Kim | B62J 1/00 280/282 |
| 2015/0307046 | A1 * | 10/2015 | Fritsch | B60R 13/105 293/144 |
| 2016/0193905 | A1 * | 7/2016 | Joseph | B60J 11/02 296/98 |
| 2016/0263979 | A1 * | 9/2016 | Suh | B60R 19/205 |
| 2018/0056908 | A1 * | 3/2018 | Sayour | B60R 19/38 |
| 2019/0001801 | A1 * | 1/2019 | Giambrone | B60J 11/04 |

* cited by examiner

APPARATUS AND SYSTEM FOR AN AUTOMATED BUMPER PROTECTION ROLL

BACKGROUND

Field of the Invention

The field of the invention relates to a universally attaching bumper protection roll that is roll-able/fold-able and modular. The universally mountable bumper protection roll may be attached to a variety of bumper surface members and rolled along at least one roll axis to form a modular, easy-to-carry portable bumper protection. Specifically, the invention relates to a roll-able bumper protection that may be reeled out along a horizontal axis that is disposed within an elongated housing that may be affixed to an exterior front and rear portion of a vehicle by means of a fastening element to protect a substantial portion of any size and shape of bumper.

Background of the Related Art

Numerous devices have been previously designed for aiding in protecting bumpers. Bumper protection is vital, especially in urban centers, where vehicles are often parallel parked on the street. It is not uncommon for vehicles to collide with other vehicles during the process of parallel parking or taking one's car out of a spot. Most of these devices, most notably the commercially available bumper protectors, feature a protective sheet that is capable of absorbing the light-impact collisions associated with parking strikes. However, they are a permanent fixture on the rear fascia of a vehicle and are an eye-sore, to say the least. Other bumper protectors require the user to install every time the car is parked by placing over the vulnerable portions of the bumper and closing the trunk door closed over a portion of the protector to secure. In both instances, the protector does not cover the entire length, or even a substantial portion of the bumper. As such, the end terminals of a vehicle bumper remain especially exposed and susceptible to parking strikes, especially when a driver is pulling out of a tight parking spot. Moreover, there remains a lack of automation—drivers continue to have to remember to install and secure the bumper protector each and every time a driver parks his or her vehicle. Finally, the bumper protectors in the market are structurally contiguous and are of a uniform composition, and therefore, the sheets do not conform to the shape of a vehicle bumper or fascia. The terminal ends of a bumper remain exposed and susceptible to the collision impacts typical of parallel parking.

Doan (US 20070290515 A1) discloses and claims a bumper protector that is not contiguous, rather it is two outwardly extending portions with a separation between, and is sensor automated. However, Doan is not modular or portable, and requires a framework that needs to be installed onto the under-carriage of a vehicle. Also, this particular bumper protector is not suitable for parallel parking strikes, since any automated protraction of the bumper portions would result in significant damage to the adjacent vehicle.

Another reference in the art is Meyer (U.S. Pat. No. 7,338,100 B2). The invention relates to a universal guard including a cover, a cover housing that contains the cover, a frame holding the cover housing, connection devices connecting the co her housing of the universal guard to an interior region of the trunk of the automobile, wherein the connection devices are slidably connected to the frame. However, Meyer also does not cover and protect the length of a vehicle bumper due to the fact that the framing is installed in the interior of the trunk. Of the bumper sheet is limited to the width of the trunk door. This design limitation leaves once again leaves the vulnerable terminal ends of the bumper exposed. Moreover, the fact that the framing is located within the interior of the trunk, forces the user to remember to open the trunk and activate the bumper protraction each and every time the vehicle is parked. The interior framing also precludes any automation features.

There is need for universal flexible bumper protector disposed within a modular housing that is affixed on the exterior of a vehicle that can protect the entire width of a vehicle bumper and do so in an automated fashion.

SUMMARY

These and other features and improvements of the present application will become apparent to one of ordinary skill in the art upon review of the following detailed description when taken in conjunction with the several drawings and the appended claims.

The present invention fills a void left behind by the current art and market. The present invention provides for an apparatus for an automated bumper protection roll, comprising: at least one housing member with a roller rotationally disposed within, wherein each terminal end of the roller is affixed to any one of an electro-mechanical rotational means and adapted for causing axial rotation of the roller; any one of roll-able polymer protective bumper sheet, wherein a partial or entire length of said sheet, in a retracted state, is rolled around the roller, such that the sheet is disposed entirely or substantially within the housing member; the partial or entire length of said sheet extends from the housing member by rotating the roller in a counter directional manner from the retracted state; and the entire width of said sheet extends from one terminal end of the roller to a second terminal end of the roller; a power circuitry composed of any one of, or combination of, 12-volt battery, solar, lithium-ion, AC/DC adapter, USB adapter, disposed within the housing member and in operable communication with the electro-mechanical rotational means coupled to any one of, or combination of, the first, and, or the second terminal end of the roller adapted for causing axial rotation of the roller and any one of, or combination of, protraction, and, or retraction of the roll-able polymer protective bumper sheet; a control circuit with programmable logic disposed within the housing member further comprising a Radio Frequency (RF) interface module in communication with the remote RF control, wherein an RF signal emitted from the remote RF control activates the power circuitry operably coupled to the electro-mechanical rotational means and any one of, or combination, of the first and, or second terminal end of the roller adapted for causing axial rotation of the roller and any one of, or combination of, protraction and, or retraction of roll-able polymer protective bumper sheet; and at least one affixing element disposed on any one side of the housing member adapted to be attachable and, or detachable to a variety of bumper surfaces.

In one embodiment, the housing member is attachable and detachable in any combination to a plurality of surfaces by at least one removable or fixed hooks, suction cups, D-rings, clips, chains, snap-closed ring, sliding snap-closed ring, wrap-around ring, wrap-around flap, buttoned wrap-around flap, c-hook, s-hook and or a tie-string.

In another embodiment, the apparatus may comprise a roll-able, polymer protective bumper sheet that is comprised of at least three distinct sheets, such that two end sheets are comprised of a more pliable protective material than a middle sheet, and configured to allow the two end sheets to conform to a shape of any one of a vehicle bumper and, or rear fascia. Additionally, the roll-able, polymer protective bumper sheet is further disposed with any one of, or combination of, a beveled, leveled, and, or a raised design for increased shock absorbance.

It is an object of the invention to provide an automated bumper protection roll, wherein the RF interface module of the control circuit allows for a full spectrum of automation related to the protraction and, or retraction the bumper sheet. One may choose to protract and, or retract with a remote controller, or with a key associated with the vehicle. Alternatively, the bumper sheet may protract and, or retract based on the vehicle being in the parked state. In yet other embodiments, sensor or contextual data of the vehicle or driver may inform the protraction and, or retraction the bumper sheet.

It is a further object of the invention to provide a bumper protection roll that may be manually drawn to cover the desired portion of a vehicle bumper. It is another object to provide for a method of using the automated bumper protection roll.

Aspects and advantages of this invention may be realized in other applications, aside from the intended application of juvenile products. Other pertinent applications that may exploit the aspects and advantages of this invention are, but not limited to: car bucket seats, bedroom, bathroom, closet doors, changing tables, playpen, bed frames, patient bed frames or rails, etc.

Other aspects and advantages of the invention will be apparent from the following description and the appended claims.

BRIEF DESCRIPTION OF DRAWINGS

The drawings illustrate the design and utility of embodiments of the present invention, in which similar elements are referred to by common reference numerals. In order to better appreciate the advantages and objects of the embodiments of the present invention, reference should be made to the accompanying drawings that illustrate these embodiments. However, the drawings depict only some embodiments of the invention, and should not be taken as limiting its scope. With this caveat, embodiments of the invention will be described and explained with additional specificity and detail through the use of the accompanying drawings in which.

DETAILED DESCRIPTION

In the following description, for purposes of explanation, numerous specific details are set forth in order to provide a thorough understanding of the invention. It will be apparent, however, to one skilled in the art that the invention can be practiced without these specific details.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The present invention relates to an automated bumper protection roll that is affixed to a front or rear bumper. The protective sheet may—in the parked state—be protracted to cover a substantial amount of the automobile bumper. In the drive state, the automated bumper protector may be retracted into the housing member affixed to the rear or front fascia of the vehicle, thus making the protective sheet inconspicuous and non-visible. Protraction or retraction of the protective sheet may be done manually, electro-mechanically, or may be automated. Automated protraction and, or retraction may be based on RF output, vehicle telematics communication, vehicle idleness, vehicle context, and, driver context. Moreover, bumper housing and, or protective sheet is housed on the exterior of the vehicle, and not within trunk or undercarriage of the vehicle. The disadvantage of trunk housing is that the width of the protective sheet would be limited in width to the width of the trunk. Unfortunately, any housing disposed within a trunk limits the width of a protective sheet by the width of the trunk, and therefore, presents significant bumper coverage constraints.

Figure 1:
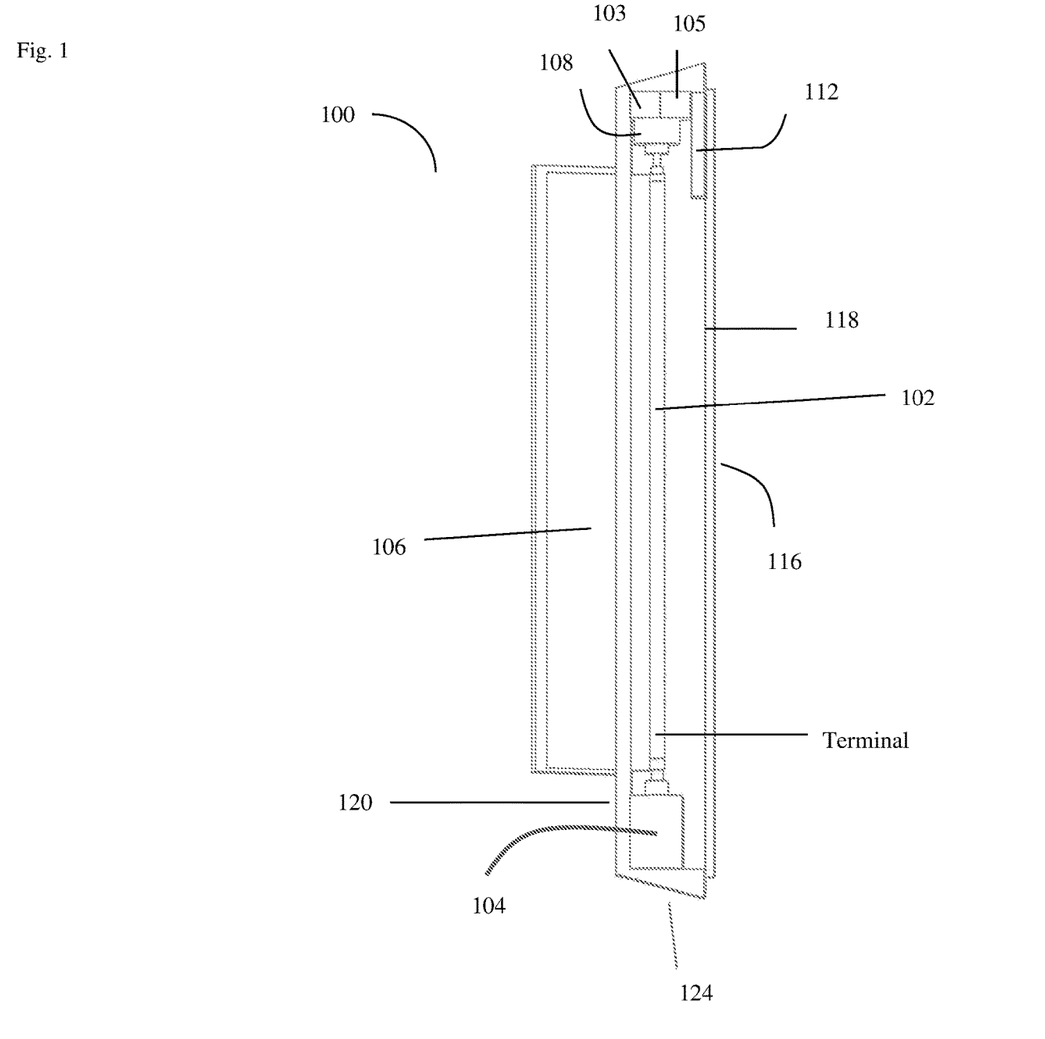
FIG. 1 is a front perspective view diagram of the bumper protection roll in accordance with an aspect of the invention.

FIG. 1 illustrates a front perspective view of the present invention according to a preferred embodiment of the invention. The preferred embodiment of the housing unit 100 may have an integrated roller 102, control circuit 103, motor output 104, protective sheet 106, sensor element 108, rotatable base, interface display 112, and affixing element 116. Housing unit 100 may encompass a housing top wall 118, bottom wall 120, and side walls 122, 124 that wrap around to meet the front wall 126 and back wall. In other embodiments, though not shown in FIG. 1, the housing unit 100 may have circular or curved side walls 122, 124 and circular or curved front and back walls 126, 128. Front wall 126 may further have an alarm to warn encroaching vehicles. Front wall 126 may also have a user interface display 112 or control circuit 103 for invoking operations manually. The front wall 126 may be void of the user interface display 112, and rather, may be included in the mobile device application.

In one embodiment, an apparatus for an automated bumper protection roll may comprise: at least one housing member 100 with a roller 102 rotationally disposed within, wherein each terminal end of the roller 102 is affixed to any one of an electro-mechanical rotational means 104 and adapted for causing axial rotation of the roller; any one of roll-able polymer protective bumper sheet 106, wherein a partial or entire length of said sheet 106, in a retracted state, is rolled around the roller 102, such that the sheet 106 is disposed entirely or substantially within the housing member 100; the partial or entire length of said sheet 106 extended from the housing member 100 by rotating the roller 102 in a counter directional manner from the retracted state; and the entire width of said sheet 106 extends from one terminal end of the roller 102 to a second terminal end of the roller 102.

The automated bumper protection roll may comprise a power circuitry 105 composed of any one of, or combination of, 12-volt battery, solar, lithium-ion, AC/DC adapter, USB adapter, disposed within the housing member 100 and in operable communication with the electro-mechanical rotational means 104 coupled to any one of, or combination of, the first, and, or the second terminal end of the roller 102 adapted for causing axial rotation of the roller 102 and any one of, or combination of, protraction, and, or retraction of the roll-able polymer protective bumper sheet 106.

The automated bumper protection roll may further comprise a control circuit 103 with programmable logic disposed within the housing member 100 further comprising a Radio Frequency (RF) interface module in communication with the remote RF control, wherein an RF signal emitted from the remote RF control activates the power circuitry 105 operably coupled to the electro-mechanical rotational means 104 and any one of, or combination, of the first and, or second terminal end of the roller 102 adapted for causing axial rotation of the roller 102 and any one of, or combination of, protraction and, or retraction of roll-able polymer protective bumper sheet 106.

In continuing reference to the automated bumper protection roll, the roll may further comprise at least one affixing element 116 disposed on any one side of the housing member 100 adapted to be attachable and, or detachable to a variety of bumper surfaces. The affixing element 116 may be any one of, or combination of, an adhesive fastener, magnetic fastener, textile fastener, hooks, buttons, suction cups, D-rings, clips, chains, snap-closed rings, sliding snap-closed rings, wrap-around rings, wrap-around flaps, buttoned wrap-around flaps, C-hooks, S-hooks, and, or tie-strings.

Furthermore, in another preferred embodiment of the present invention, a plurality of modular adjustable, expandable, and, or customizable components may constitute the housing member 100 (not shown). Such additional modularity allows for a user to have additional ease of installation, carriage, and delivery. The components may attach to vehicle surface in such a fashion that three bumper protection roll units serve to protect a single bumper or fascia. In such an embodiment, the bumper protection roll is able to deliver a wider coverage of bumper protection. Also, it takes into account the curvature of the terminal ends of a vehicle bumper or fascia. The terminal ends may be protected, just as well as the main portion. In one embodiment, the terminal end bumper protection rolls may be smaller in size than the bumper protection roll affixed to protect the main portion of the vehicle bumper or fascia. Furthermore, the terminal end bumper protection rolls may be housed in a more pliable plastic housing member in order to negotiate the curvature of the terminal ends of the vehicle bumper or fascia.

In other embodiments (not shown), the modular bumper protection roll units may comprise a housing members configured to be connected in series to form the larger, unified automated bumper protection roll. In alternative embodiments, the customizable components may be of different shapes and sizes and are customizable to a user's preference.

Furthermore, while also not shown, at least a single solar panel, or a series of panels may be disposed on the front-panel surface 126 of the housing member 100. Such a surface 126 receives the most sun exposure, and therefore, solar panel installation on said surface may be preferable.

The panels may further be in operable communication with the control circuit 103 and, or power circuit 105. Such power may be used to supplement the other on-board sources, or may be the exclusive source of power. Such power may be used for actuating the electro-mechanical rotational means at each terminal end 104 of the housing member 100. Such actuation results in the protraction and retraction of the protective sheet 106. Moreover, sources of power may be necessary for utilizing other features, such as alarm, rotation of the rotatable base, and, or the protracting space creating means unit.

The housing member 100 may be disposed with a control circuit 103. The control circuit 103, in addition to comprising programmable logic configured for automated provisioning, it may further comprise a parsing layer and an interface module for causing retrieval and, or pushing of pre-defined operators in any one of a dynamic, scheduled or static fashion.

The parsing layer may be configured to receive request messages from a user input on-board or remotely, and, or from a remote server via the interface module and retrieve the requested content from the pre-loaded file cache. Alternatively, request messages generated dynamically based on a user input and, or from contextual data may cause the retrieving of the requested operation from the pre-loaded file cache. User input may be prompted answers and, or user volunteered answers. User input may also be user-specific usage data or user behavior. Additionally, user input may be based on contextual data derived from a user mobile device and, or wearable device. Moreover, user input may further encompass any one of, or combination of travel destination, travel distance, out-board vehicular, craft sensor data, travel conditions, and, or landscape or surrounding data.

The control circuit 103 may further comprise of an RF interface module, which may be in communication with the remote RF control, and further wherein, the remote RF control is embedded within any one of the keyless remote device of a vehicle and, or remote door opening device of the vehicle. The RF interface module may be in communication with the remote RF control, and further wherein, the remote RF control is embedded within any one of a remote device, such as remote control, wearable device, RFID-embedded device, etc. The RF interface module is interfaced to short-range communication protocol reader embedded within an owner's mobile device and, or to a Wide-Area Network access point and further configured to actuate electro-mechanical rotational means based on any one of a contextual driver information, vehicle information, driver proximity, etc.

Still in reference to FIG. 1, a housing unit 100 may include a user interface display 112, wherein the user interface may be integrated as a built-in console display. While in the present example, a built-in console display is shown, any type of user interface display 112 may be disclosed, including a mobile device display, a wearable device display, monitors, or any type of access device, without departing from the scope of the invention. In a preferred embodiment, the user interface display 112 may include a display page for receiving a request for an operational selection. The request being from a menu, or user-initiated. The display page may then prompt a user to confirm the request. Other embodiments may include a display page that does not require a user to confirm the request, and instead, signals confirmation of the request and initialization.

Alternate embodiments may involve a user interface display 112 authenticating a user by any form of short-range or long-range wireless protocol standards, without departing from the scope of the invention. The module may identify and authenticate the particular roll unit and user device by recognizing the unique tag, and then, authenticate the user by identifying the user device located at the particular roll unit. The unique, short-range tag may be a NFC tag, RFID chip, Bluetooth, ZigBee, or any short-range or long-range communication protocol standard. Additional methods of authentication may be accomplished via user input.

In yet another embodiment, the user interface display 112 may include a voice-activated request option receiving a request voice command, whereby the request voice command may be in communication with a voice-activated module querying at least one pre-defined database based on the request voice command. The voice-activated module may be in communication with a natural language module, whereby the request voice command is sent from the voice-activated module to the natural language module. The natural language module may be configured to convert the request voice command into a roll unit operational instruction, and the instruction instructing the voice activated module to query at least one pre-defined database based on the request voice command.

In yet another embodiment, the user interface display 112 may receive a request voice command for a roll unit operation and interact with a user via voice response by having a voice activated module in communication with the natural language module and the voice activated module in communication with a voice response module, whereby the voice response module alerts the user of the various stages of the operational selection via the voice-activated user interface using natural language to describe the various stages of processing, from an introduction and identification of a user; to an operational inquiry or request or suggestion; to confirmation of an operational selection; and finally, initialization.

Figure 2A:
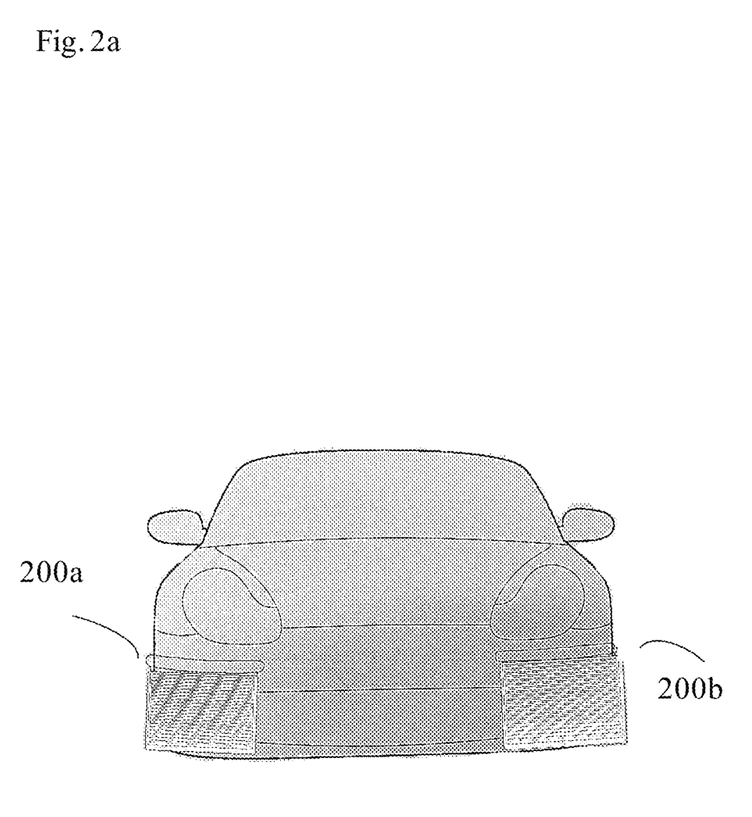
FIG. 2a is a front perspective diagram of the protracted and front-mounted bumper protection roll in accordance with an aspect of the invention.
Figure 2B:
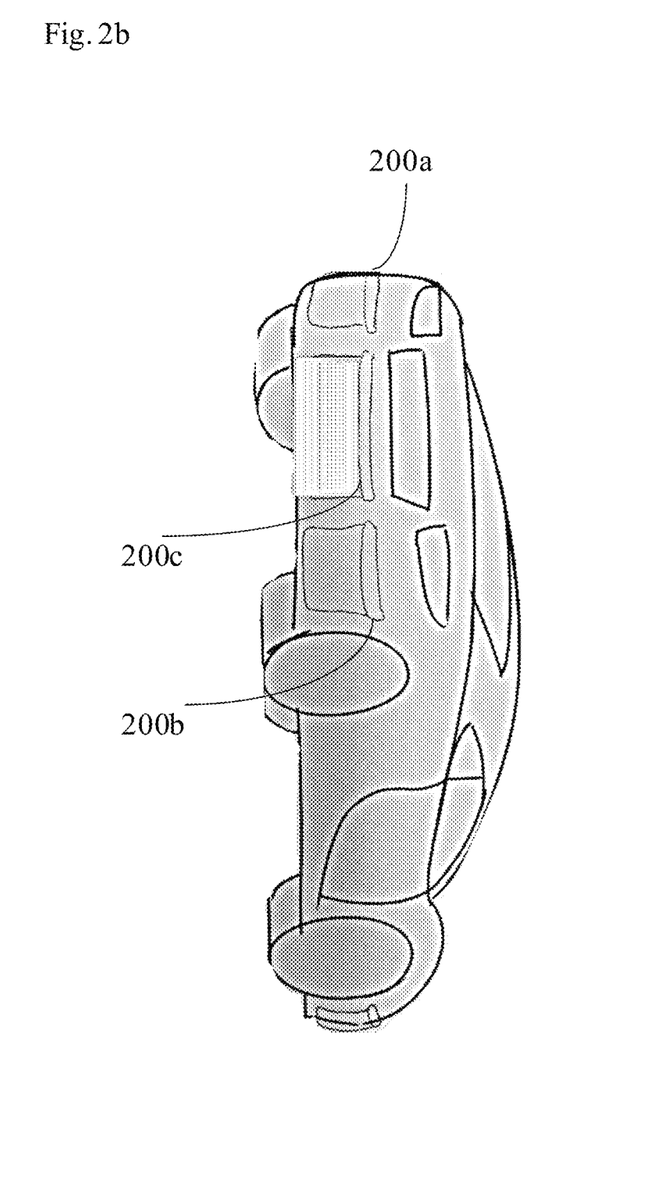
FIG. 2b is a front perspective diagram of the protracted and rear-mounted bumper protection roll in accordance with an aspect of the invention.

FIG. 2a illustrates a front perspective view of the automated bumper protection roll in accordance with an aspect of the invention. FIG. 2b illustrates a rear perspective of the automated bumper protection roll in accordance with an aspect of the invention. Both FIGS. 2a and 2b shows three distinct automated bumper protection units, each with a distinct housing 200a, 200b, 200c; rollers with a roller rotationally disposed within, wherein each terminal end of the roller is affixed to any one of an electro-mechanical rotational means and adapted for causing axial rotation of the roller; any one of roll-able polymer protective bumper sheet, wherein a partial or entire length of said sheet, in a retracted state, is rolled around the roller, such that the sheet is disposed entirely or substantially within the housing member 200a, 200b, 200c; the partial or entire length of said sheet extended from the housing member 200a, 200b, 200c by rotating the roller in a counter directional manner from the retracted state; and the entire width of said sheet extends from one terminal end of the roller to a second terminal end of the roller.

The terminal end roller units may be comprised of a more pliable thermoplastic material, capable of configuring to the curvature of a terminal end of vehicle bumper or fascia. The middle unit 200b may be comprised of a more rigid composition. When all three housing members 200a, 200b, 200c have the protective sheet extended, the entire surface of the bumper may be covered. Alternatively, some space may exist between sheets exposing trivial area of the vehicle bumper.

In alternative embodiments (not shown), a single unit may be disposed with a single extended protective sheet, covering a substantial and, or the entire surface of a vehicle bumper. In yet other alternative embodiments, the roll-able, polymer protective bumper sheet is comprised of at least three distinct sheets extended from a single housing member, such that two end sheets are comprised of a more pliable protective material than a middle sheet, and configured to allow the two end sheets to conform to a shape of any one of a vehicle bumper and, or rear fascia.

In some embodiments, the automated bumper protection roll is comprised of a polymer protective bumper sheet, further disposed with any one of, or combination of, a beveled, leveled, and, or a raised design for increased shock absorbance.

While not shown in FIG. 2a or 2b, the automated bumper protection roll may be further comprising of a single or a plurality of sensors embedded and configured to monitor and sense any one of the contextual driver information, vehicle information, and driver proximity, as part of a vehicle context, whereby the automated bumper protection roll adaptively reconfigures based on said vehicle context. The vehicle context may further comprise: data input over a network, from any one of, or combination of, a user mobile device, wearable device, vehicle telematics, geo-location, Internet of Things, user-defined input history, and web automation service, whereby the automated bumper protection roll adaptively reconfigures based on said data. The automated bumper protection roll may further comprise, an impact detection sensor operably couple to an interface means for transmitting impact data to a storage mean, a processor for executing instructions stored in memory, wearing when executed, configure the bumper protection role unit to cause any one of the following; transfer data over a network interface for analytics, actuator motor, and push content and, or update a dashboard on any one of a user device.

In another embodiment of the invention, a system may comprise of a sensor or a series of sensors to detect at least one vehicle's position and orientation as part of a user input to inform actuation and provisioning. Audio sensor data may also be a part of the user input data. The object data captured by the sensor or sensors related to vehicle position and orientation, may be communicated to the micro controller or processor, which will relay input signals from sensors and relay output commands to the electro-mechanical rotational means or rotatable base. The micro controller may be a small computer or a single integrated circuit containing a processor core, memory and programmable input. The micro controller codes the data from the transduced signals, including user data from the sensors and pre-defined cached data, to actuate the electro-mechanical rotational means or rotatable base to deliver the most efficient bumper protection—reactively or proactively. In one embodiment, whereby processor is not integrated with the control circuit, the housing members and, or sensors wirelessly communicates with the micro controller through any short-range mode of wireless communication, such as Wi-Fi, UWB, Bluetooth, ZigBee, or any protocol standards for short range wireless communications with low power consumption. Another embodiment of the system may have the housing members connect to the micro controller through USB, or any cable, connector and communication protocols used in a bus for connections, communications, and power supply for electronic devices. In yet other embodiments, the micro controller and housing member may interface over a wide area network, or through an access-point or gateway mediated network.

While not shown in FIG. 2a or 2b, embodiments may include the addition of a remote server to provide for back-end functionality and support. The server may be situated adjacent or remotely from the system and connected to each system via a communication network. In one embodiment, the server may be used to support verification or authentication of a user and a mobile device application function. In authenticating a user, a server may be further caused to recognize the user device at a particular system component housing a unique short-range communication tag. The server may identify and authenticate the particular component and user device by recognizing the unique tag, and then, authenticate the user by identifying the user device located at the particular component. The unique, short-range tag may be a NFC tag, RFID chip, Bluetooth, ZigBee, or any short-range communication protocol standard. The remote server may be further configured to support a user operations history function. The remote server may be further configured to provide a user-control system, which authenticates the user and retrieves usage data of the user and applies the data against a pre-defined criteria of use. Provisioning of the remote server may be delivered as a cloud service. In yet other embodiments, an automated bumper protection roll unit may be associated with an Internet of Things, whereby the unit is fully integrated into a user's home automation system, thereby providing additional contextual information for provisioning and actuation.

In further detail, while still not shown, a housing unit 200a, 200b, 200c may have a rotatable base, which may pivot the housing unit 200a, 200b, 200c in at least one axis of motion. A rotating base allows for the housing unit 200a, 200b, 200c to rotate on its base to allow for more targeted strike impact absorption. For instance, during the course of parallel parking, the detected presence of another object or vehicle may trigger the control circuit to actuate the rotating base for targeted impact absorption. It may be further enhanced by using a suite of sensors in an object tracking system. The sensors may be configured for sensing objects in any position or orientation, in real-time. Other embodiments may include a housing unit 200a, 200b, 200c with an additional space creating absorber unit coupled to the rotatable base, the pivoting and rotation of which may be also enhanced with the addition of at least one sensor or an object tracking system. In one embodiment, a rotating base may allow for the housing unit to rotate or move on its base in at least one axis of motion constantly to provide for a panning effect during the course of parallel parking. may be further enhanced by using at least a single sensor or an object tracking system.

While also not shown in FIG. 2a or 2b, some embodiments may include a housing unit 200a, 200b, 200c that includes a sound effect system. The sound effect system delivers an alarming sound directed at an approaching vehicle during parallel parking. According to one embodiment, the sound effect is created by a sensor couple to a control circuit, which may further actuate the release of the sound from a sound creation unit.

Figure 3:
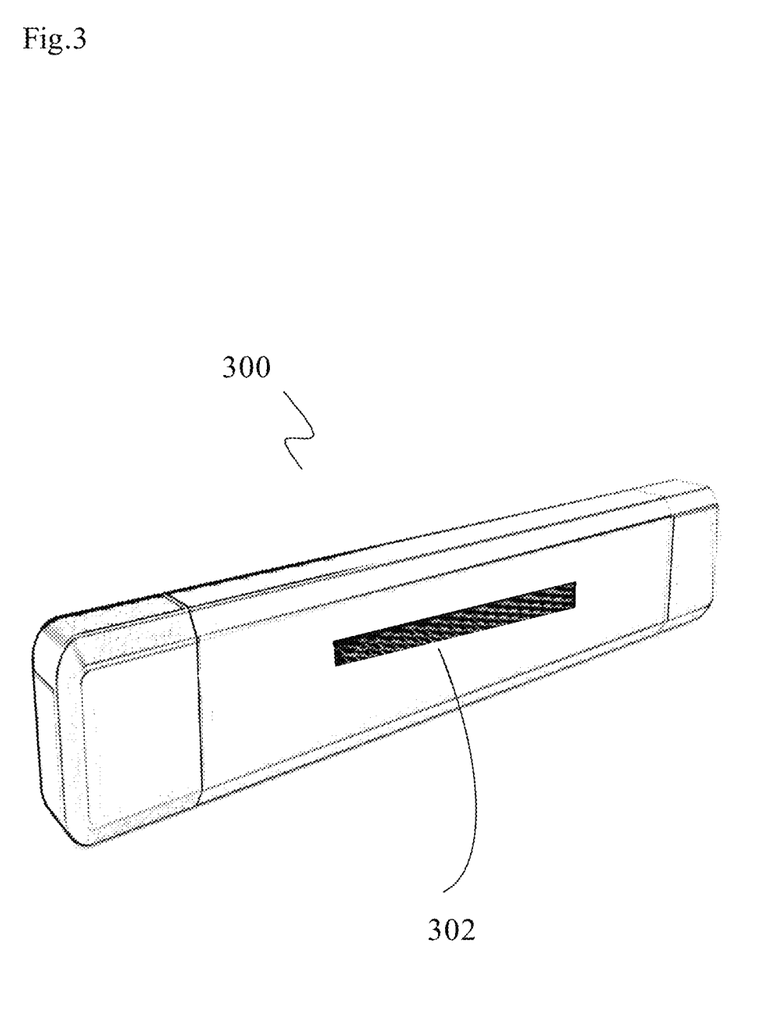
FIG. 3 is a top plan view of the affixed bumper protection roll with fastening elements in accordance with an aspect of the invention.

FIG. 3 illustrates an embodiment of the present invention, illustrating the fastening element, in accordance with one embodiment. The fastening element 302 may be any one of, or combination of, magnetic strips, adhesive fasteners, fabric fasteners, snap-on attachment, clips, chains, rings, removable or fixed hooks, suction cups, D-rings, clips, chains, snap-closed ring, sliding snap-closed rings, wrap-around rings, wrap-around flaps, buttoned wrap-around flaps, c-hooks, s-hooks, fixed hooks, zippers, double-sided tape, magnetic fastener, textile fastener, and or a tie-string etc. In an alternative embodiment, the housing member 300 may be a unitary construction with the vehicle bumper or fascia, fabricated during factory construction/assembly, or as an after-market installation. For instance, in one embodiment, the automated vehicle bumper protection unit may be disposed within a bumper or other vehicle component. In such a scenario, the automated bumper protection unit may not be visible as an added-on unit, but rather, as a single, contiguous element that is seamless and native to the vehicle body.

In one embodiment, while not shown in FIG. 3, the housing member 300 may comprise a plurality of storage compartments—modular, adjustable, and, or expandable. The storage member compartments may be of different shapes and sizes. The storage compartments may be, any one of or a combination of, but not limited to, hidden, visible and or netted. Other compartments may be grouped with others, or may be individual. Furthermore, the storage compartments may additionally be capable of being locked. Alternatively, the compartments may be dimensioned to fit standard objects.

In a preferred embodiment of the present invention, a method of manufacturing the automated bumper protection unit may be provided, said method comprising the steps of (1) disposing a roller rotationally disposed within a housing member, wherein each terminal end of the roller is affixed to any one of a mechanical rotational means and adapted for causing axial rotation of the roller; (2) rolling any one of roll-able polymer protective bumper sheet around the roller, wherein a partial length of said sheet, in a retracted state, is disposed substantially within the housing member and at least a partial length of said sheet is extended from the housing member by rotating the roller in a counter directional manner from the retracted state; and the entire width of said sheet extends from one terminal end of the roller to a second terminal end of the roller; and (3) coupling at least one affixing element disposed on any one side of the housing member adapted to be attachable and, or detachable to a variety of bumper surfaces.

The terms and phrases as indicated in quotation marks (" ") in this section are intended to have the meaning ascribed to them in this Terminology section applied to them throughout this document, including in the claims, unless clearly indicated otherwise in context. Further, as applicable, the stated definitions are to apply, regardless of the word or phrase's case, tense or any singular or plural variations of the defined word or phrase.

The term "or" as used in this specification and the appended claims is not meant to be exclusive rather the term is inclusive meaning "either or both".

References in the specification to "one embodiment", "an embodiment", "a preferred embodiment", "an alternative embodiment", "a variation", "one variation", and similar phrases mean that a particular feature, structure, or characteristic described in connection with the embodiment is included in at least an embodiment of the invention. The appearances of phrases like "in one embodiment", "in an embodiment", or "in a variation" in various places in the specification are not necessarily all meant to refer to the same embodiment or variation. The term "couple", "coupled", "coupling", or any variation thereof, as used in this specification and the appended claims refers to either an indirect or direct connection between the identified elements, components or objects. Often the manner of the coupling will be related specifically to the manner in which the two coupled elements interact. Specifically, this term may be used to define tow elements joined by a bolted fastener, a latch, a hook, or any other reasonably readily removable fastening device.

I claim:

1. An apparatus for an automated bumper protection, said apparatus comprising:
    at least three rectangular housing members affixed on a rear of a vehicle and external to a closed trunk of the vehicle;
    one roller with two horizontally opposable terminal ends rotationally disposed within each of the three housing members;
    at least one electro-mechanical rotational means affixed to at least one terminal end of the one roller and adapted for causing axial rotation of the roller; and
    at least one roll-able protective bumper sheet configured to absorb an impact from and/or towards another vehicle during a state of protraction of said sheet from the three housing members resulting from electro-mechanical rotation of the one roller.

2. The automated bumper protection roll of claim 1, wherein the housing member is comprised of a pliable and/or thermoplastic polymer.

3. The apparatus of claim 1, wherein the three housing members, each with rollers, comprise of two equally sized end members/rollers and a wider middle member/roller.

4. The apparatus of claim 1, wherein the protraction of the sheet by the electro-mechanical rotation of the roller is caused by at least one of a vehicle state change such as reversing, parked, or locked in a parked state.

5. An apparatus for an automated bumper protection, said apparatus comprising:
    three rectangular housing members horizontally affixed in series on a rear of a vehicle and external to a closed trunk of the vehicle;
    a roller with two horizontally opposable terminal ends rotationally disposed within each housing member;
    at least one electro-mechanical rotational means affixed to at least one terminal end of each roller and adapted for causing axial rotation of each roller; and
    at least one roll-able protective bumper sheet configured to absorb an impact from and/or towards another vehicle during a parallel parking and/or while in a parked position during a state of protraction of said sheet from each housing member resulting from electro-mechanical rotation of each roller.

6. The apparatus of claim 5, wherein the three housing members, each with rollers, comprise of two equally sized end members/rollers and a wider middle member/roller.

7. The apparatus of claim 5, wherein protraction of the roll-able protective bumper sheet by the electro-mechanical rotation of the roller is caused by at least one of a vehicle state change such as reversing, parked, or locked in a parked state.

8. The apparatus of claim 5, wherein protraction of the roll-able protective bumper sheet by the electro-mechanical rotation of the roller is activated by an operator of the vehicle.

* * * * *